US010761269B2

(12) United States Patent
Carlson et al.

(10) Patent No.: US 10,761,269 B2
(45) Date of Patent: Sep. 1, 2020

(54) THERMAL FLASH CONDITIONER FOR FUSION SPLICING; AND METHODS

(71) Applicant: CommScope Technologies LLC, Hickory, NC (US)

(72) Inventors: Scott Carlson, Bloomington, MN (US); Paul Suek, Eden Prairie, MN (US); Marlon E. Holmquist, Gibbon, MN (US); Mark D. Narum, Minnetonka, MN (US); Richard William Bruneau, Apple Valley, MN (US)

(73) Assignee: CommScope Technologies LLC, Hickory, NC (US)

( * ) Notice: Subject to any disclaimer, the term of this patent is extended or adjusted under 35 U.S.C. 154(b) by 439 days.

(21) Appl. No.: 15/662,551

(22) Filed: Jul. 28, 2017

(65) Prior Publication Data

US 2018/0031766 A1   Feb. 1, 2018

Related U.S. Application Data

(60) Provisional application No. 62/368,601, filed on Jul. 29, 2016.

(51) Int. Cl.
*B23K 10/00* (2006.01)
*G02B 6/255* (2006.01)
*G02B 6/245* (2006.01)

(52) U.S. Cl.
CPC .......... *G02B 6/2551* (2013.01); *G02B 6/245* (2013.01); *G02B 6/2555* (2013.01)

(58) Field of Classification Search
CPC .... G05B 6/2551; G05B 6/245; G05B 6/2555; H05H 1/26; B23K 10/00

USPC ........... 219/121.46, 121.45, 121.48, 121.56, 219/121.58
See application file for complete search history.

(56) References Cited

U.S. PATENT DOCUMENTS

| 4,902,323 | A | | 2/1990 | Miller et al. |
| 5,570,446 | A | * | 10/1996 | Zheng .................. G02B 6/2551 219/121.45 |
| 5,772,327 | A | * | 6/1998 | Zheng .................... G01K 11/06 374/160 |
| 5,949,940 | A | * | 9/1999 | Botelho ................. G02B 6/245 385/114 |
| 5,954,974 | A | | 9/1999 | Broer et al. |
| 6,244,323 | B1 | | 6/2001 | Miller |
| 6,402,856 | B1 | | 6/2002 | Vetrano |

(Continued)

*Primary Examiner* — Mark H Paschall
(74) *Attorney, Agent, or Firm* — Merchant & Gould P.C.

(57) ABSTRACT

The present disclosure relates to a method of fusion splicing an optical fiber. The method includes the steps of mechanically stripping a coating layer from the optical fiber to form a bare fiber end and inserting the bare fiber end of the optical fiber into a resistive heating element structure to remove residual coating from a cladding layer. The resistive heating element structure shapes a severed end of the coating layer such that the severed end is fully within a cylindrical envelope defined by a non-disturbed portion of the coating layer. The method further includes a step of loading the optical fiber into an alignment groove of a fiber alignment fixture such that the shaped severed end of the optical fiber is in contact with the alignment groove. The method includes a step of fusion splicing the bare fiber end of the optical fiber to a cable fiber.

16 Claims, 12 Drawing Sheets

(56) References Cited

U.S. PATENT DOCUMENTS

| | | | | |
|---|---|---|---|---|
| 6,823,117 | B2* | 11/2004 | Vakili | G02B 6/14 385/43 |
| 7,003,985 | B2 | 2/2006 | Swain et al. | |
| 7,181,111 | B2 | 2/2007 | Ahrens | |
| 9,016,953 | B2 | 4/2015 | Ott et al. | |
| 9,167,626 | B1 | 10/2015 | Wu | |
| 9,933,572 | B2* | 4/2018 | Akiyama | G02B 6/2555 |
| 10,126,503 | B2* | 11/2018 | Meo | G02B 6/255 |
| 2003/0062070 | A1* | 4/2003 | Swain | B08B 7/0071 134/105 |
| 2007/0031098 | A1* | 2/2007 | Wiley | G02B 6/245 385/134 |
| 2007/0284767 | A1 | 12/2007 | Kashyap | |
| 2014/0131326 | A1* | 5/2014 | Sato | G02B 6/2553 219/121.58 |
| 2014/0338195 | A1* | 11/2014 | Zhao | G02B 6/245 30/90.1 |
| 2016/0161672 | A1* | 6/2016 | Bauco | B29D 11/00663 264/1.27 |

* cited by examiner

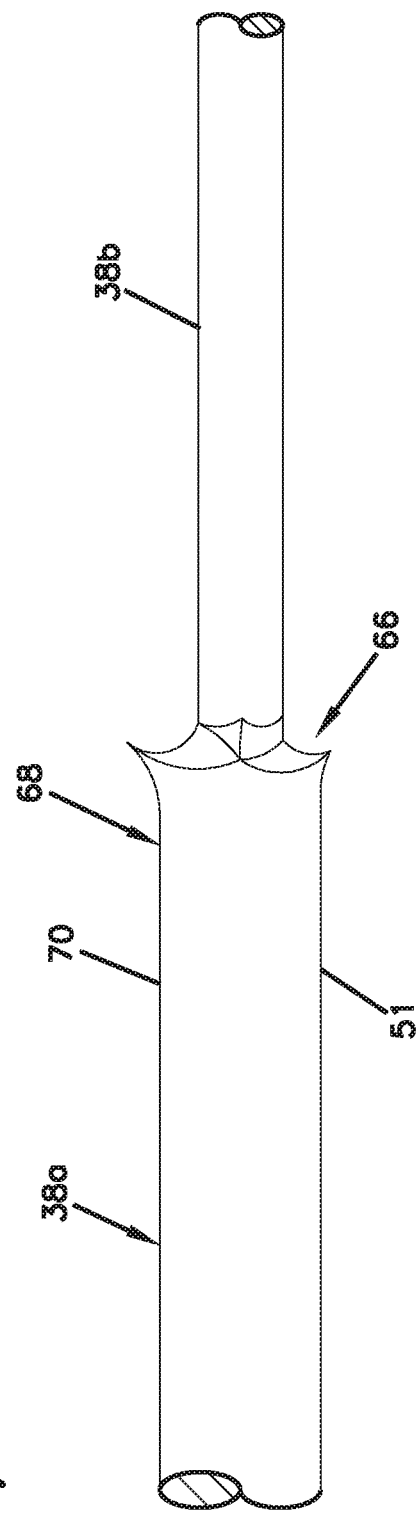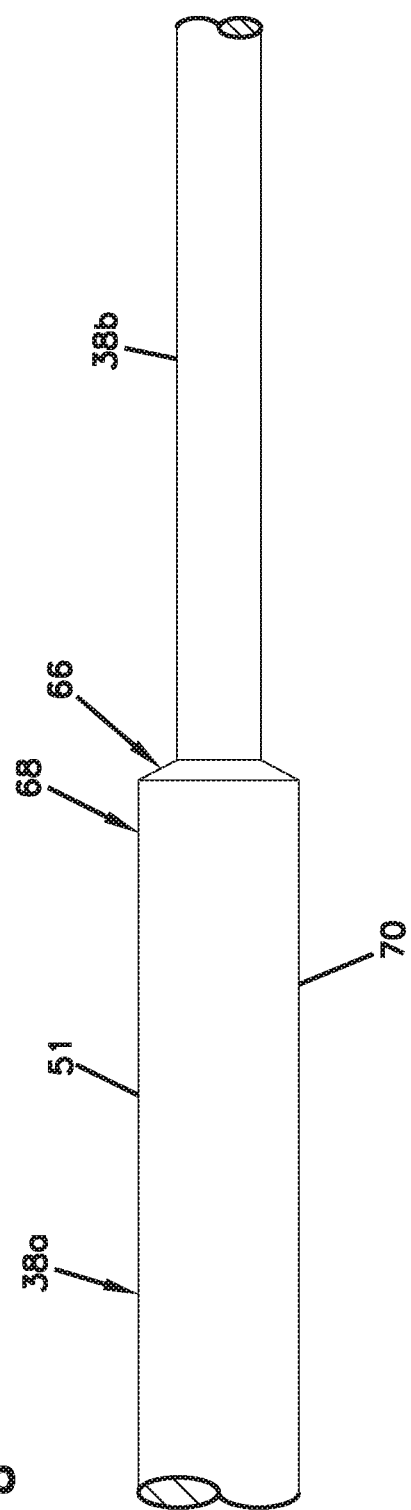

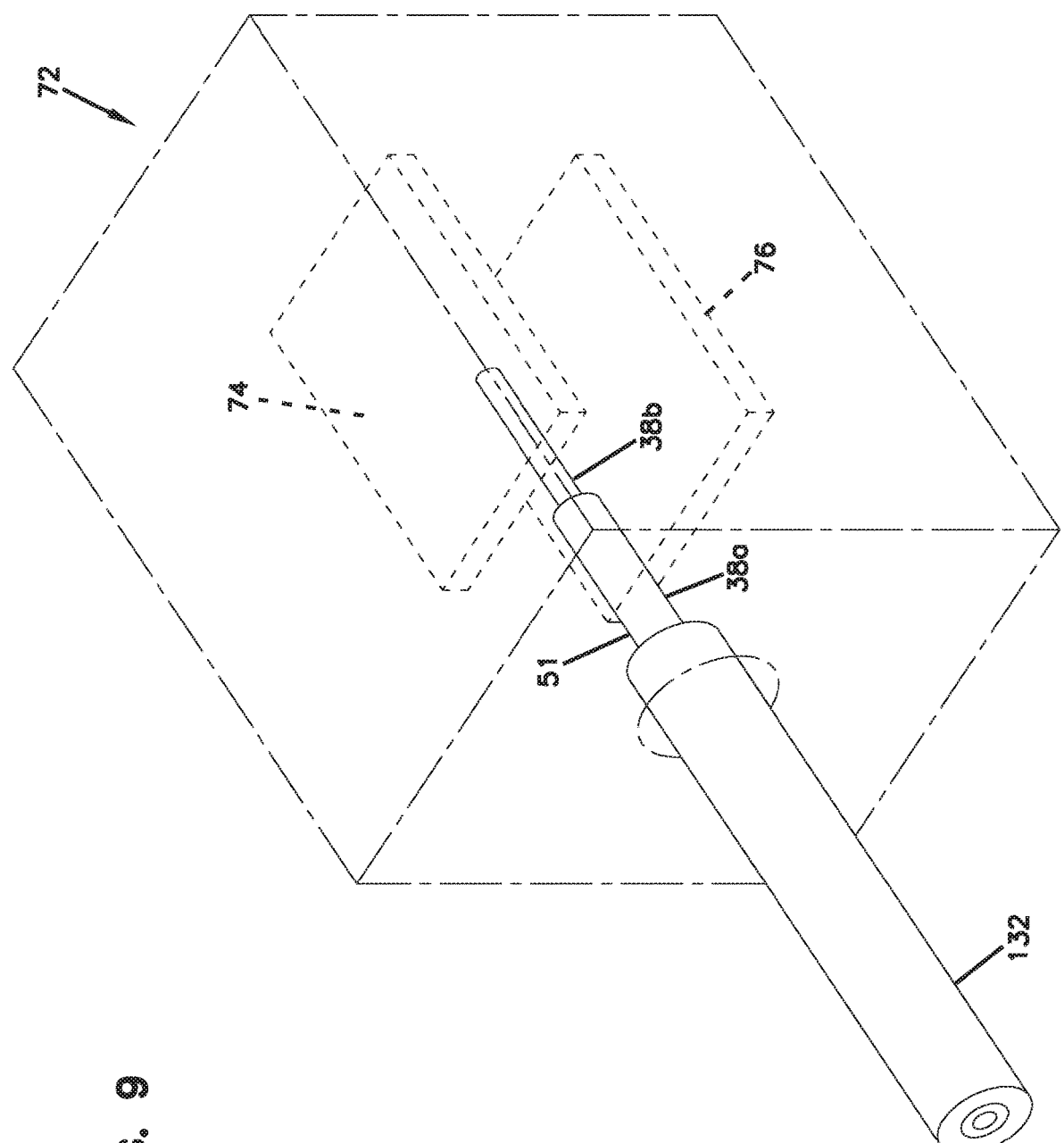

THERMAL FLASH CONDITIONER FOR FUSION SPLICING; AND METHODS

CROSS REFERENCE TO RELATED APPLICATIONS

This application claims the benefit of provisional application Ser. No. 62/368,601, filed Jul. 29, 2016, which is incorporated herein by reference in its entirety.

TECHNICAL FIELD

The present disclosure relates generally to optical fiber communication systems. More particularly, the present disclosure relates to systems, devices and methods that facilitate optical fusion splicing operations.

BACKGROUND

Fiber optic communication systems are becoming prevalent in part because service providers want to deliver high band width communication capabilities (e.g., data and voice) to customers. Fiber optic communication systems employ a network of fiber optic cables to transmit large volumes of data and voice signals over relatively long distances. Fiber optic connectors are an important part of most fiber optic communication systems. Fiber optic connectors allow optical fibers to be quickly optically connected without requiring a splice. Fiber optic connectors can include single fiber connectors and multi-fiber connectors.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers.

Fiber optic connectors are typically mounted at the ends of fiber optic cables. In this regard, a fiber optic connector can be directly terminated to its respective fiber optic cable or spliced-on to its respective fiber optic cable. With a directly terminated fiber optic connector, an optical fiber of the fiber optic cable is directly secured within a ferrule of the fiber optic connector. For example, an end portion of the optical fiber of the fiber optic cable is adhesively bonded within the ferrule of the fiber optic connector. With a splice-on fiber optic connector, the optical fiber of the fiber optic cable is spliced to a rear stub end of an optical fiber stub that has been pre-secured within a ferrule of the fiber optic connector. U.S. Pat. No. 9,016,953, which is hereby incorporated by reference in its entirety, discloses example splice-on connector configurations. Improvements are needed to increase the speed of fusion splicing operations relating to the manufacture of splice-on fiber optic connectors and also relating to fusion splicing operations in general.

SUMMARY

The present disclosure generally relates to a method of fusion splicing an optical fiber. The optical fiber can have a glass core, a cladding layer, and a coating layer. The method includes the steps of mechanically stripping the coating layer from the optical fiber to form a bare fiber end. The method also includes a step of inserting the bare fiber end of the optical fiber into a resistive heating element structure to remove residual coating from the cladding layer. The resistive heating element structure can also be used to shape a severed end of the coating layer such that the severed end is fully within a cylindrical envelope defined by a non-disturbed portion of the coating layer. The method further includes a step of loading the optical fiber into an alignment groove of a fiber alignment fixture such that the shaped severed end of the optical fiber is in contact with the alignment groove. The method includes a step of fusion splicing the bare fiber end of the optical fiber to a cable fiber.

It will be appreciated that the thermal flash conditioning technology that includes the resistive heating element structure is not limited to fusion splicing optical fibers, but may be used in a variety of other applications. For example, the thermal flash conditioning technology may also be useful in preparation of optical fibers prior to being inserted into ferrules for traditional connector termination processing. Generally, the thermal flash conditioning technology may be used for any optical fiber process that involves cleaning residual debris.

The present disclosure also relates to a method of end-to-end fusion splicing a ferrule fiber stub to an optical fiber. The method includes the steps of stripping a coating layer of the ferrule fiber stub and the optical fiber to expose bare fiber segments of the ferrule fiber stub and the optical fiber. The bare fiber segments can include a glass core and cladding. The method includes the step of inserting the bare fiber segments of the ferrule fiber stub and the optical fiber into a resistive heating element structure to remove residual coating from the cladding of the bare fiber segments. Severed ends of the coating layer of both the ferrule fiber stub and the optical fiber are shaped such that the severed ends of the coating layer are fully within a cylindrical envelope defined by a non-disturbed portion of the coating layer. The method includes a step of loading the ferrule fiber stub and the optical fiber into respective alignment grooves of a fiber alignment fixture such that the shaped severed ends of both the ferrule fiber stub and the optical fiber are respectively in contact with the alignment grooves; and fusion splicing the bare fiber segment of the ferrule fiber stub and the bare fiber segment of the optical fiber together.

Another aspect of the present disclosure relates to a method of fusion splicing optical fibers. The method includes the steps of removing residual coating from stripped surfaces of optical fibers to be fusion spliced including bare fiber ends of the optical fibers. Removing the residual coating can be achieved by inserting the bare fiber ends of the optical fibers in a resistive heating element structure. The resistive heating element structure can apply resistance heating to cause removal of the residual coating and cut ends of a coating layer of the optical fibers are shaped such that the cut ends of the coating layer are fully within a cylindrical envelope respectively defined by a non-disturbed portion of the coating layer of the optical fibers. The method including the step of fusion splicing the bare fiber ends of the optical fibers.

A further aspect of the present disclosure relates to an apparatus for removing residual coating exposed on a stripped optical fiber. The apparatus can include a housing having side walls, a lid, and a bottom that together define a closed heating chamber. At least one side wall can define a center fiber insertion opening for allowing the stripped optical fiber to be inserted into the heating chamber. A heating resistive element structure can be positioned within the heating chamber. The heating resistive element structure can provide resistance heating to the stripped optical fiber to cause the residual coating to be removed therefrom, and to shape a severed cleaved edge of a coating layer of the stripped optical fiber such that the severed cleaved edge is within a cylindrical envelope defined by a non-disturbed portion of the coating layer.

Another aspect of the present disclosure relates to a heating chamber for removing residual coating exposed on a stripped optical fiber. The heating chamber can include a first resistive plate and a second resistive plate opposite the first resistive plate. The heating chamber can have at least two enclosed sides defined by the first and second resistive plates. The first and second resistive plates can each include a resistance coil for passing electrical current within the heating chamber. The first and second resistive plates can be configured to apply resistance heating to the stripped optical fiber for removing the residual coating therefrom.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a schematic view of an example stripped fiber prior to shaping in accordance with the principles of the present disclosure.

FIG. 8 is a schematic view of the example stripped fiber after shaping in accordance with the principles of the present disclosure.

FIG. 9 is an example heating chamber in accordance with the principles of the present disclosure.

DETAILED DESCRIPTION

Figure 1:
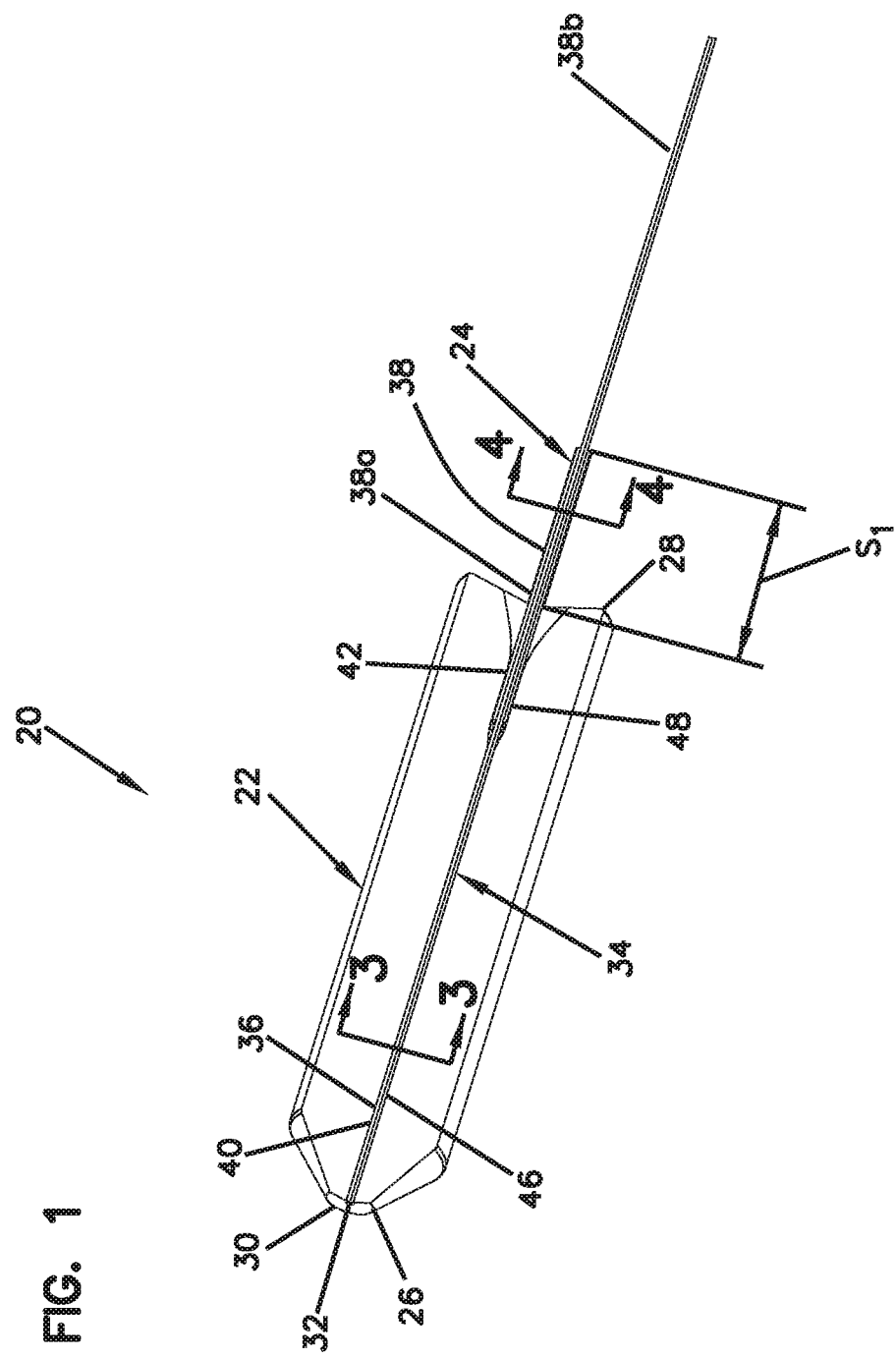
FIG. 1 is a front, perspective, cross-sectional view of a ferrule assembly that can be fusion spliced to an optical fiber of a fiber optic cable using systems in accordance with the principles of the present disclosure.

Aspects of the present disclosure relate to efficient and user friendly techniques and devices adapted to simplify splicing operations and reduce cost associated with fusion splicing operations. In certain examples, such techniques and devices can include resistive heating elements to accommodate splicing of an optical fiber stub of a ferrule with an optical fiber of a fiber optic cable. In another example, the resistive heating elements can be used to accommodate splicing of the optical fibers of two fiber optic cables.

In certain examples, fusion splicing methods in accordance with the principles of the present disclosure use non-contact energy sources to fuse two aligned optical fibers together. As used herein, non-contact energy source techniques relate to techniques that do not require direct mechanical contact with the optical fiber but instead involve exposing the optical fiber to an energy source which brings about a desired result.

Aspects of the present disclosure also relate to an active fiber alignment system having features that promote the efficient and precise loading of optical components desired to be co-axially aligned with each other in preparation for fusion splicing. The active alignment system can include fixtures for receiving the optical components. The fixtures can include coarse (i.e., macro) and fine (i.e., micro) component positioning features for quickly and precisely loading the optical components on the fixtures. The coarse component positioning features can include pre-locating v-grooves and the fine component positioning features can include alignment v-grooves. Once co-axial alignment has been achieved, the aligned optical fibers are fusion spliced together. An example active alignment system is disclosed in U.S. Pat. No. 7,181,111, which is hereby incorporated by reference in its entirety. Also, fusion splicers having active alignment (e.g., the Fujikura 62S Fusion Splicer) are sold by AFL Telecommunications LLC.

One example non-contact energy source technique suitable for use with fiber alignment stations in accordance with the principles of the present disclosure involves exposing the optical fibers desired to be fusion spliced to a plasma such as the arc discharge caused by electrical current breaking down and flowing through a normally nonconductive media (e.g., air) between two spaced-apart electrodes. In this regard, corona treatment devices can be used to ionize air by applying a voltage between two pointed electrodes to generate a corona discharge plasma between the electrodes. By exposing a surface of the ends of the optical fibers desired to be spliced to the corona discharge, the two optical fibers can be fusion spliced together. Another example non-contact energy source technique involves exposing the optical fibers to a laser beam. An example device for generating such a laser beam includes a carbon dioxide ($CO_2$) laser. Further examples of non-contact energy source techniques involve exposing the optical fibers to a torch flame (e.g., from a gas torch), exposing the optical fibers to infrared heat from an infrared heat source, and exposing the optical fibers to certain types of electro-magnetic wave-based energy sources.

Typically, in a splice-on connector application, the optical fiber of the fiber optic cable is optically connected at a fusion splice to an optical fiber stub extending from a ferrule. The fusion splice is generally positioned at a splice location spaced from a rear end (i.e., a base) of the ferrule. In one embodiment, the splice location is within a connector body and is positioned no more than 20 mm from the rear end of the ferrule. Due to location and length constraints of the fiber, alignment devices used to hold the fiber samples, prior to and during the fusion splice, are in close proximity to the extreme heat of the fusion arc. Thus, it is desired that the materials near the arc have the mechanical integrity to withstand the extreme temperatures.

Figure 2:
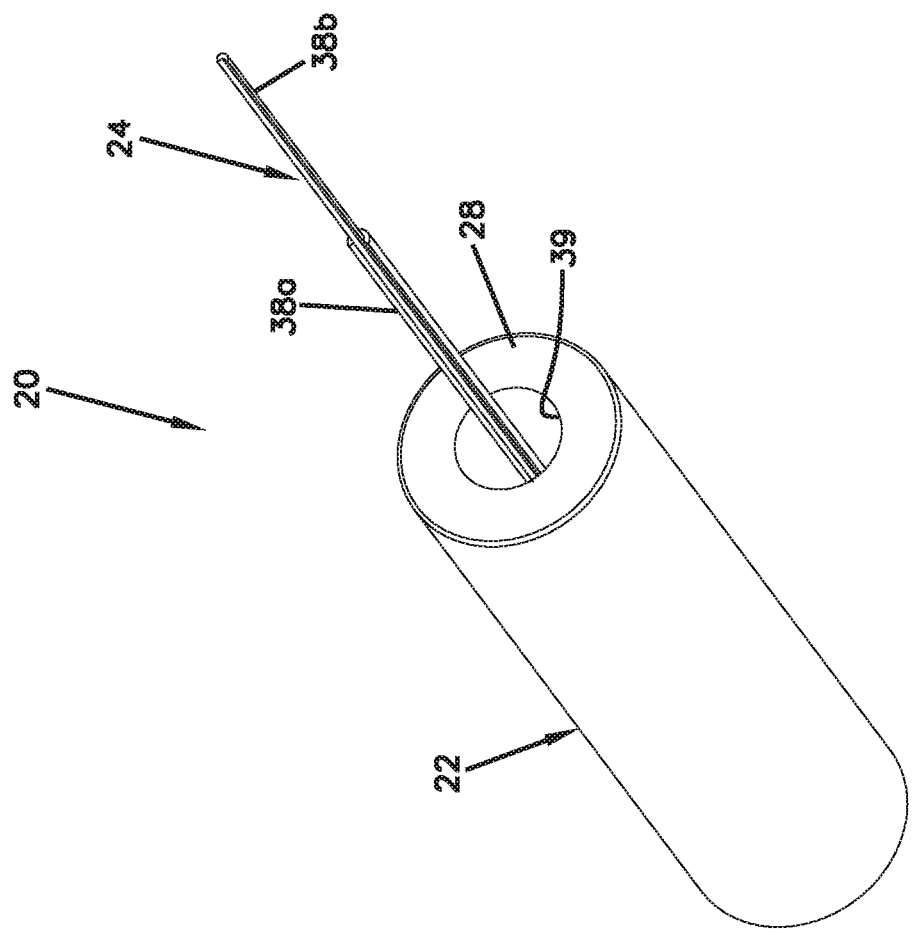
FIG. 2 is a rear, perspective view of the ferrule assembly of FIG. 1.

FIGS. 1 and 2 illustrate one example ferrule assembly 20 which is suitable for practicing aspects of the present disclosure. The ferrule assembly 20 includes a ferrule 22 and an optical fiber 24 (e.g., a stub optical fiber) secured to the ferrule 22. In one example, the ferrule 22 is generally cylindrical. In one example, the ferrule has a diameter in the range of 1-3 millimeters. Example ferrules include SC ferrules having nominal outer diameters of 2.5 millimeters and LC ferrules having nominal outer diameters of 1.25 millimeters. The ferrule 22 includes a front end 26 positioned opposite from a rear end 28. The front end 26 preferably includes an end face 30 at which an interface end 32 of the optical fiber 24 is located. The ferrule 22 defines a ferrule bore 34 that extends through the ferrule 22 from the front end 26 to the rear end 28. The optical fiber 24 includes a first portion 36 secured within the ferrule bore 34 and a second portion 38 (i.e., a stub portion) that extends rearwardly from the rear end 28 of the ferrule 22. The stub portion 38 of the fiber 24 preferably extends a predetermined distance $S_1$ beyond the rear end 28 of the ferrule 22. The first portion 36 of the optical fiber 24 is preferably secured by an adhesive (e.g., epoxy) within the ferrule bore 34 of the ferrule 22. The interface end 32 preferably includes a processed end face accessible at the front end 26 of the ferrule 22.

The ferrule 22 is preferably constructed of a relatively hard material capable of protecting and supporting the first portion 36 of the optical fiber 24. In one embodiment, the ferrule 22 has a ceramic construction. In other embodiments, the ferrule 22 can be made of alternative materials such as Ultem, thermoplastic materials such as Polyphenylene sulfide (PPS), other engineering plastics or various metals. In one example, the ferrule 22 can be a single fiber ferrule such as a ferrule for an SC connector, and ST connector, or an LC connector.

Figure 3:
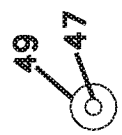
FIG. 3 is a cross-sectional view taken along section line 3-3 of FIG. 1; the cross-sectional view shows a bare fiber portion of an optical fiber of the ferrule assembly.
Figure 4:
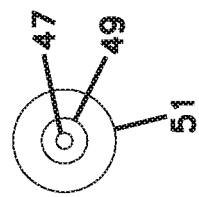
FIG. 4 is a cross-sectional view taken along section line 4-4 of FIG. 2; the cross-section shows a coated fiber portion of the ferrule assembly.
Figure 5:
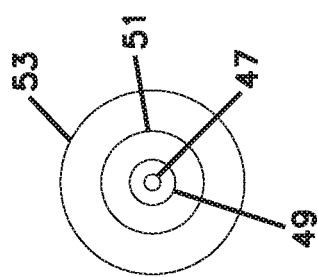
FIG. 5 is a cross-sectional view showing an alternative configuration for the coated fiber portion of FIG. 4.

The first portion 36 of the optical fiber 24 can include a bare fiber segment 46 that fits within a first bore segment 40 of the ferrule 22 and a coated fiber segment 48 that fits within a second bore segment 42 of the ferrule 22. The bare fiber segment 46 is preferably bare glass and, as shown at FIG. 3, includes a core 47 surrounded by a cladding layer 49. The core 47 has a diameter in the range of about 8-10 micrometers and the cladding layer 49 has a diameter in the range of about 120-130 micrometers. In certain embodiments, the coated fiber segment 48 includes one or more coating layers 51 surrounding the cladding layer 49 (see FIG. 4). In certain embodiments, the coating layer or layers 51 can include a polymeric material such as acrylate having an outer diameter in the range of about 200-300 micrometers, or in the range of 230-270 micrometers. In still other embodiments, the coating layer/layers 51 can be surrounded by a buffer layer 53 (e.g., a tight or loose buffer layer) (see FIG. 5) having an outer diameter in the range of about 500-1100 micrometers, or in the range of 800-1000 micrometers or about 900 micrometers.

The stub portion 38 of the optical fiber 24 includes a coated fiber portion 38a and a bare fiber portion 38b. The bare fiber portion 38b is located at a free end of the stub portion 38 of the optical fiber 24 and the coated fiber portion 38a is located between the bare fiber portion 38b and the rear end 28 of the ferrule 22. The coated fiber portion 38a can have the same structure as the coated fiber segment 48 and can include the fiber core surrounded by the cladding layer and the coating layer (e.g., an acrylate coating or other coating that may have an outer diameter in the range of 200-300 micrometers or 230-270 micrometers or other ranges). With respect to the bare fiber portion 38b of the stub portion 38 of the optical fiber 24, the coating layer has been stripped off or otherwise removed to expose bare fiber (i.e., bare glass) having only the core and cladding similar to the bare fiber segment 46.

Figure 6:
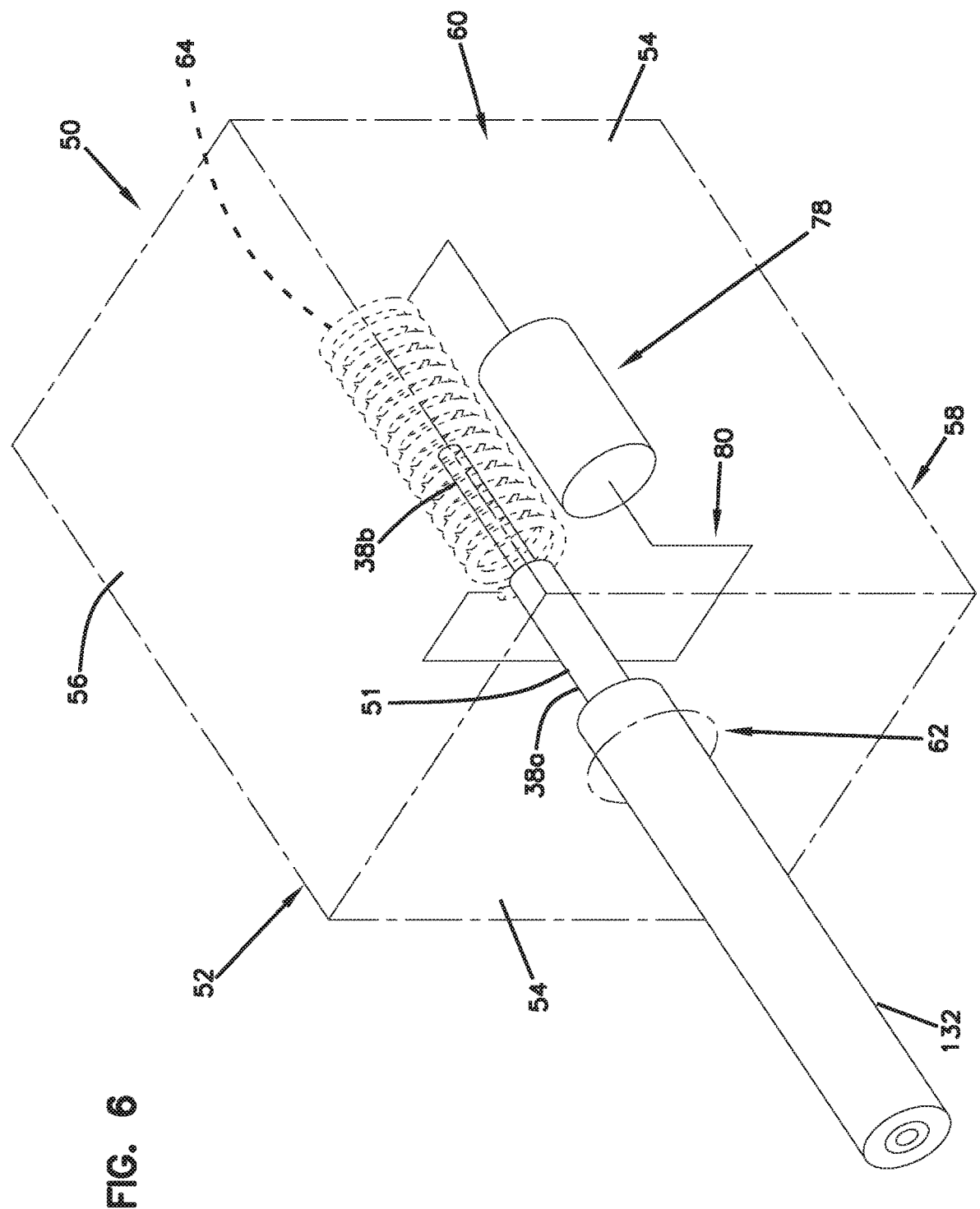
FIG. 6 is an example resistive heater unit in accordance with the principles of the present disclosure.

FIG. 6 schematically depicts an example resistive heater unit 50 (e.g., apparatus) illustrating a thermal flash conditioning technology that may be used for removing any residual coating still exposed on the optical fiber 24 after stripping. In the example shown, the resistive heater unit 50 includes a housing 52 having a plurality of side walls 54, a lid 56, and a bottom 58 that together define a closable or sealable heating chamber 60. At least one of the plurality of side walls 54 can define a center fiber insertion opening 62 to permit the passage of the optical fiber 24 that has been stripped or the bare fiber portion 38b into the heating chamber 60. The apparatus 50 can include one or more heating resistive element structures 64 (e.g., wire coil, glow plug coil, spring coil) disposed within the heating chamber 60 to supply resistance heating to the bare fiber portion 38b of the optical fiber 24. The bare fiber portion 38b can be inserted into a center of the heating resistive element structure 64 (e.g., center of the loop coil).

The heating resistive element structure 64 can be heated by the application of electricity to glow red at temperatures in excess of about 900° C., although alternatives are possible. For example, the heating resistive element structure 64 can be set to glow yellow at temperatures in excess of 1500° C. The heat volatizes the residual coating causing the residual coating on the cladding to be removed from the bare fiber portion 38b. The resistive heat can be applied circumferentially over the whole bare fiber portion 38b, although alternatives are possible. For example, the resistive heat may be applied over one or two sides of the bare fiber portion 38b. In some examples, the heating resistive element structure 64 is sufficiently hot to cause the residual coating to burst from the bare fiber portion 38b in no more than about 3 seconds. It will be appreciated that the position of the bare fiber portion 38b of the optical fiber 24 in the heating resistive element structure 64 is important for obtaining a clean fiber. The optical fiber 24 does not contact the heating resistive element structure 64 directly while in position within the resistive heater unit 50 or the heating chamber 72 such that there is no mechanical assistance. It will be appreciated that blown air is not needed to process the bare fiber portion 38b within the resister heater unit 50.

Referring to FIG. 7, upon stripping the optical fiber 24 of the coating layer 51, a severed cleaved edge 66 of the coating layer 51 may be jagged such that the severed cleaved edge 66 bulges out beyond a cylindrical envelope 68 defined by a non-disturbed portion 70 of the coating layer 51. The severed cleaved edge 66 can be shaped by resistive heating while the bare fiber portion 38b is within the heating chamber 60. FIG. 8 shows the severed cleaved edge 66 after it has been shaped to be within the cylindrical envelope 68 defined by the non-disturbed portion 70 of the coating layer 51. A well-shaped coating edge is important to achieve consistent low fiber angle presentation when splicing. This helps to improve low loss splice performance. Also, a clean fiber is important to keep contamination out of the plasma zone when a fiber is spliced, which is critical to consistent low loss splices. In one example, the coating layer 51 has been reduced by 5 to 10 microns, although alternatives are possible.

In certain examples, a heating chamber 72 may be used for removing residual coating. FIG. 9 shows an example heating chamber 72 that includes two opposing resistive plates that could be used to process an end of a fiber ribbon (e.g., a plurality of fibers held in parallel relation by a matrix material). In one example, the heating chamber 72 includes a first resistive plate 74 and a second resistive plate 76 opposite and parallel to the first resistive plate 74. In certain examples, the heating chamber 72 can have at least two enclosed sides that are defined by the first and second resistive plates 74, 76, although alternatives are possible. For example, the heating chamber 72 may be completely sealed or enclosed.

The first and second resistive plates 74, 76 can each include a resistance coil for passing electrical current within the heating chamber 72. Similar to the heating resistive element structure 64, the first and second resistive plates 74, 76 can be arranged and configured to apply resistance heat to the bare fiber portion 38b of the optical fiber 24 for removing residual coating therefrom. In one example, the resistive or resistance heat can be applied over one or two sides of the bare fiber portion 38b, although alternatives are possible. Likewise, the first and second resistive plates 74, 76 can be used to shape the severed cleaved edge 66 of the optical fiber 24 such that the severed cleaved edge 66 forms within the cylindrical envelope 68 defined by the non-disturbed portion 70 of the coating layer 51. In certain examples, the first and second resistive plates 74 can be used to process ends of a fiber ribbon (e.g., a plurality of fibers held in parallel relation by a matrix material).

It will be appreciated that the resistive heater unit 50 and the heating chamber 72 are both controllable for heat duration and coil temperature. A source 78 (see FIG. 6) can be adapted to supply current to an electric circuit 80. The heating resistive element structure 64 can be adapted to be energized by current in the electric circuit 80. The resistive heater unit 50 and the heating chamber 72 are adapted to leave a relatively clean glass surface free of mechanical damage, particulates or hazardous chemicals in preparation of fusion splicing.

Figure 10:
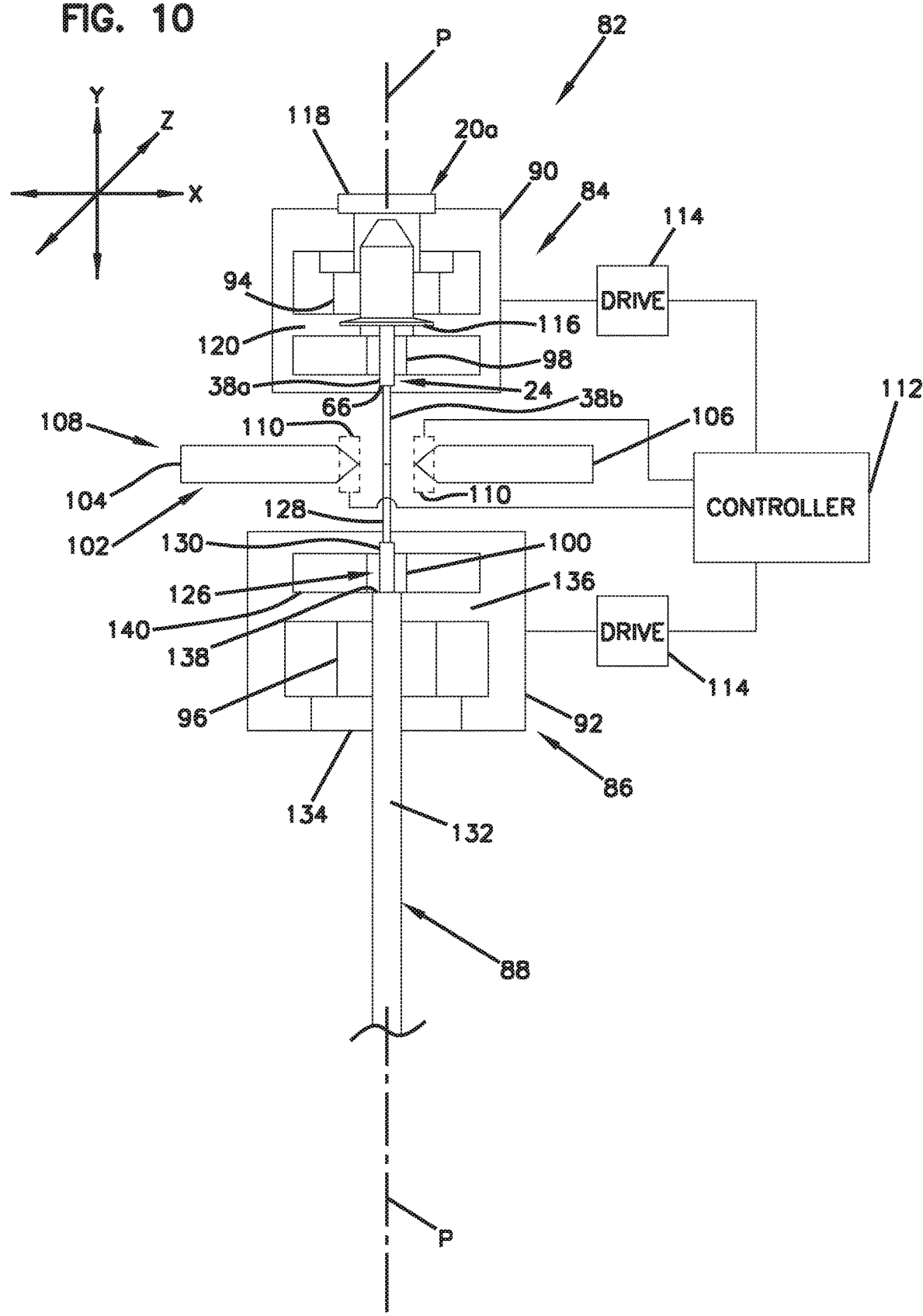
FIG. 10 schematically depicts an active fiber alignment system in accordance with the principles of the present disclosure.
Figure 11:
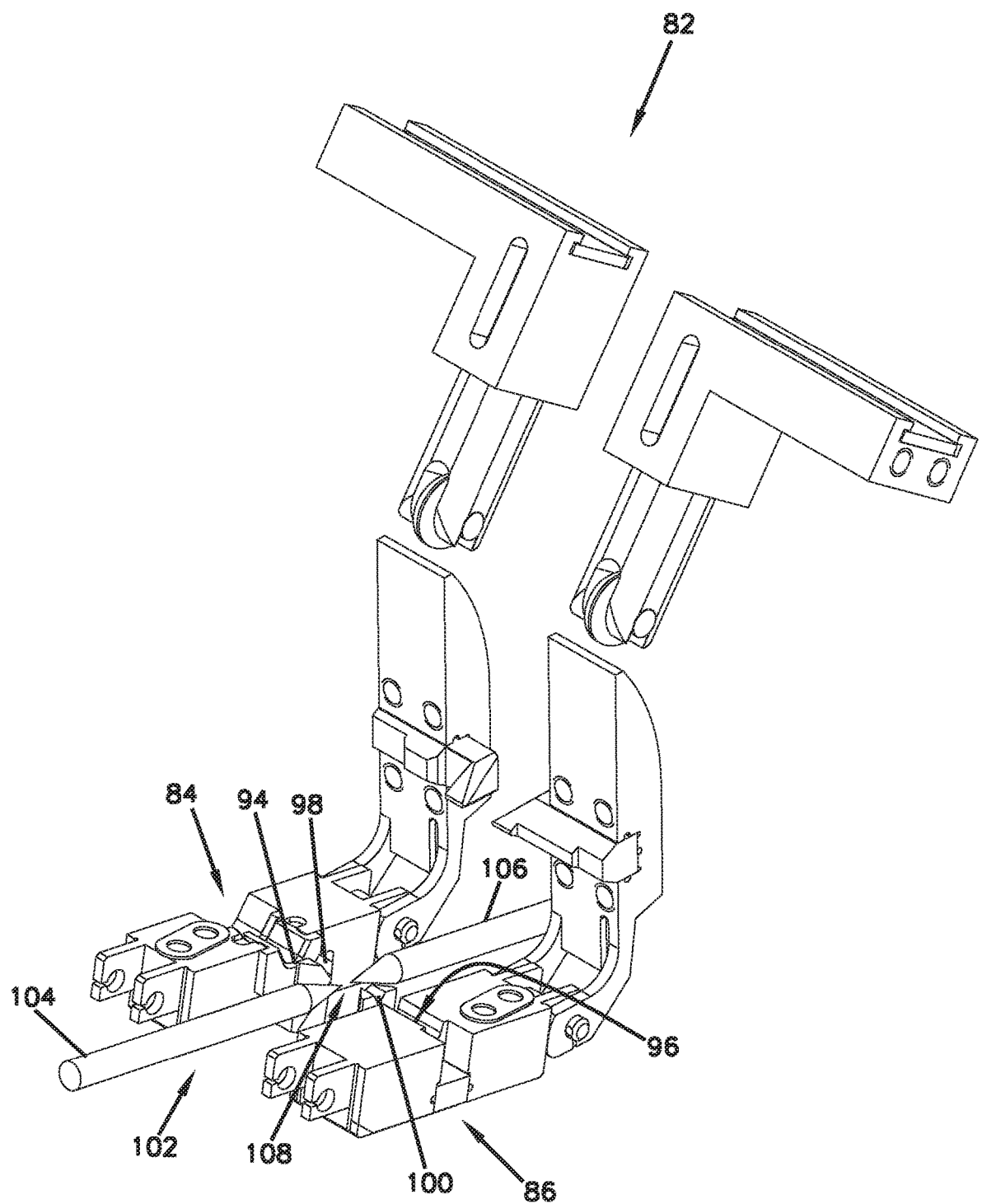
FIG. 11 is a perspective view of the active fiber alignment system of FIG. 10.

FIG. 10 schematically depicts an active fiber alignment system 82 in accordance with the principles of the present disclosure. FIG. 11 is a perspective view of the active fiber alignment system 82. The fusion splicing system 82 includes first and second alignment fixtures 84, 86 for holding optical components including optical fibers. In one example, the first alignment fixture 84 is adapted for holding a ferrule assembly 20a and the second alignment fixture 86 is adapted for holding a prepared end portion of a fiber optic cable 88. Each of the first and second alignment fixtures 84, 86 includes a base 90, 92 defining a pre-locating v-groove 94, 96 and a fiber alignment v-groove 98, 100. The system 82 also includes a plasma discharge device 102 including plasma discharge electrodes 104, 106 positioned at a splicing location 108 (i.e., a splice zone) between the first and second fiber alignment fixtures 84, 86, cameras 110 for generating fiber alignment data, and a controller 112 that interfaces with the cameras 110 so as to receive the fiber alignment data from the cameras 110. The system also includes drives 114 controlled by the controller 112 that move the first and second alignment fixtures 84, 86 to provide active fiber alignment based on feedback from the cameras 110.

The ferrule assembly 20a can have the same basic configuration as the ferrule assembly 20 including ferrule 22 supporting optical fiber 24 having stub portion 38 with coated fiber portion 38a and bare fiber portion 38b. The ferrule assembly 20a further includes a flange 116 mounted near the rear end 28 of the ferrule 22 and a removable dust cap 118 mounted at the front end 26 of the ferrule 22.

The ferrule assembly 20a is shown loaded within the first fiber alignment fixture 84. As so loaded, the ferrule 22 fits within the pre-locating v-groove 94, the coated fiber portion 38a fits within the fiber alignment v-groove 98, and the bare fiber portion 38b projects outwardly from the first fiber alignment fixture 84 into the splicing location 108. Details of the fiber alignment grooves and pre-locating v-grooves will be described with reference to FIGS. 14-15.

Figure 12:
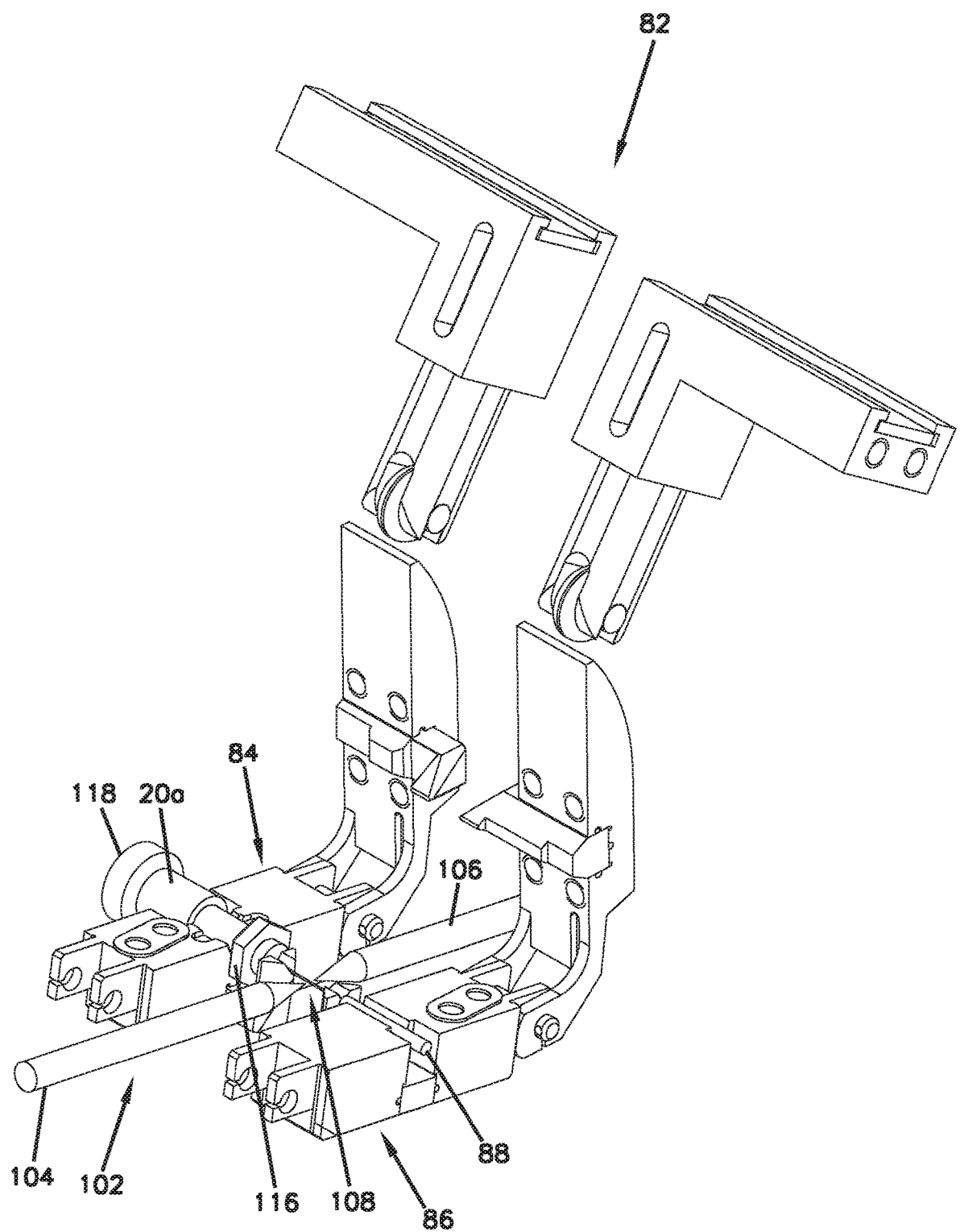
FIG. 12 is a perspective view of the fiber alignment system of FIG. 11 showing an optical fiber stub of a ferrule spliced to an optical fiber cable.
Figure 16:
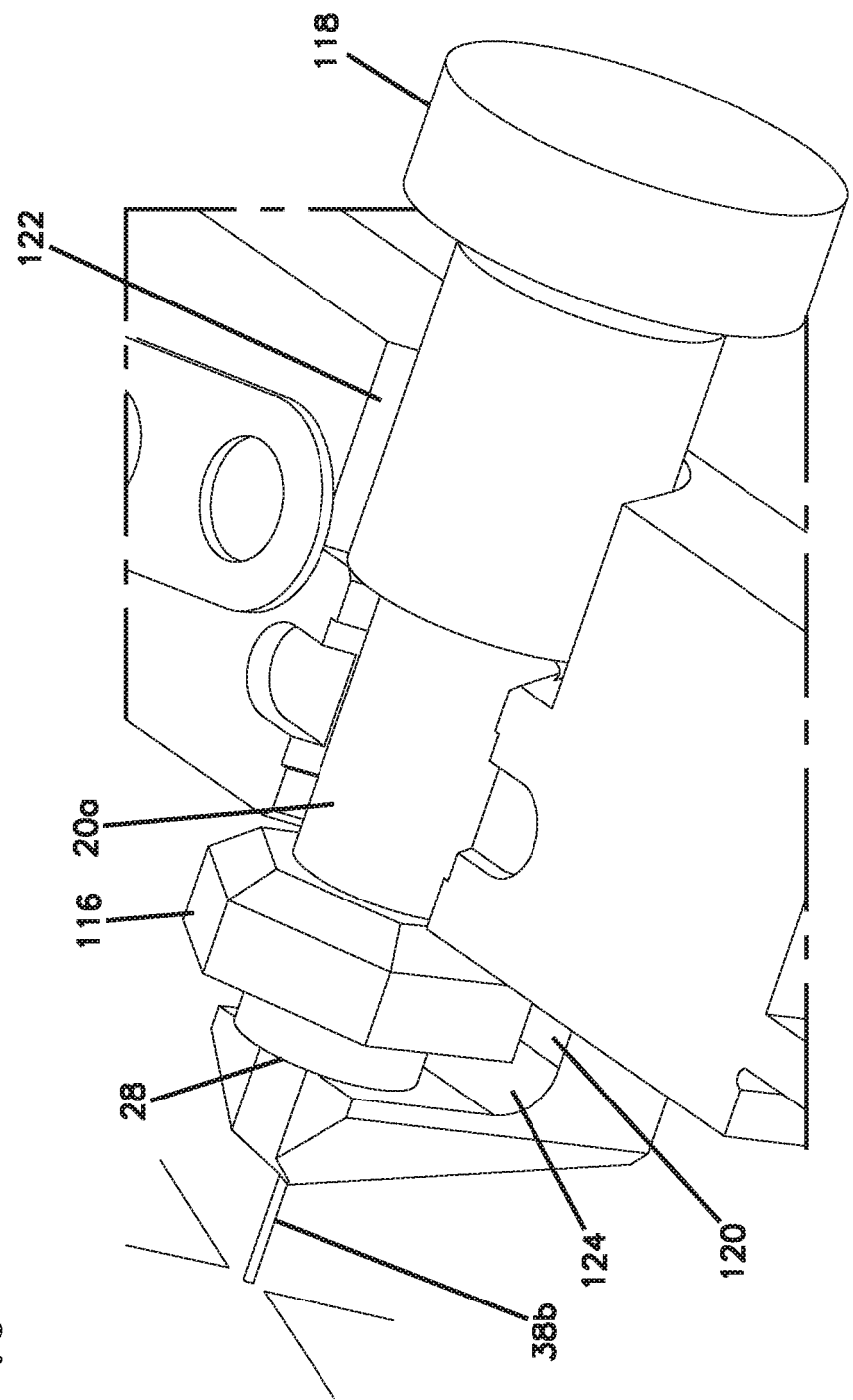
FIG. 16 is an enlarged view of the first alignment fixture of FIG. 11 with a ferrule assembly mounted therein.

FIGS. 11 and 12 are perspective views of the active fiber alignment system 82. The first fiber alignment fixture 84 further includes a slot 120 (see FIG. 16) for receiving the flange 116 and a dust-cap v-groove 122 (see FIG. 16) for receiving the dust cap 118. A stop surface 124 (see FIG. 16) is defined by the first fiber alignment fixture 84 at the slot 120 adjacent to a back end of the fiber alignment v-groove 98. When the ferrule assembly 20a is loaded into the first fiber alignment fixture 84, the rear end 28 of the ferrule 22 abuts against the stop surface 124 to ensure the stub portion 38 of the fiber extends a pre-established distance beyond the fiber alignment v-groove 98. The severed cleaved edge 66 of the optical fiber 24 is positioned in the fiber alignment v-groove 98 (see FIG. 10).

Figure 13:
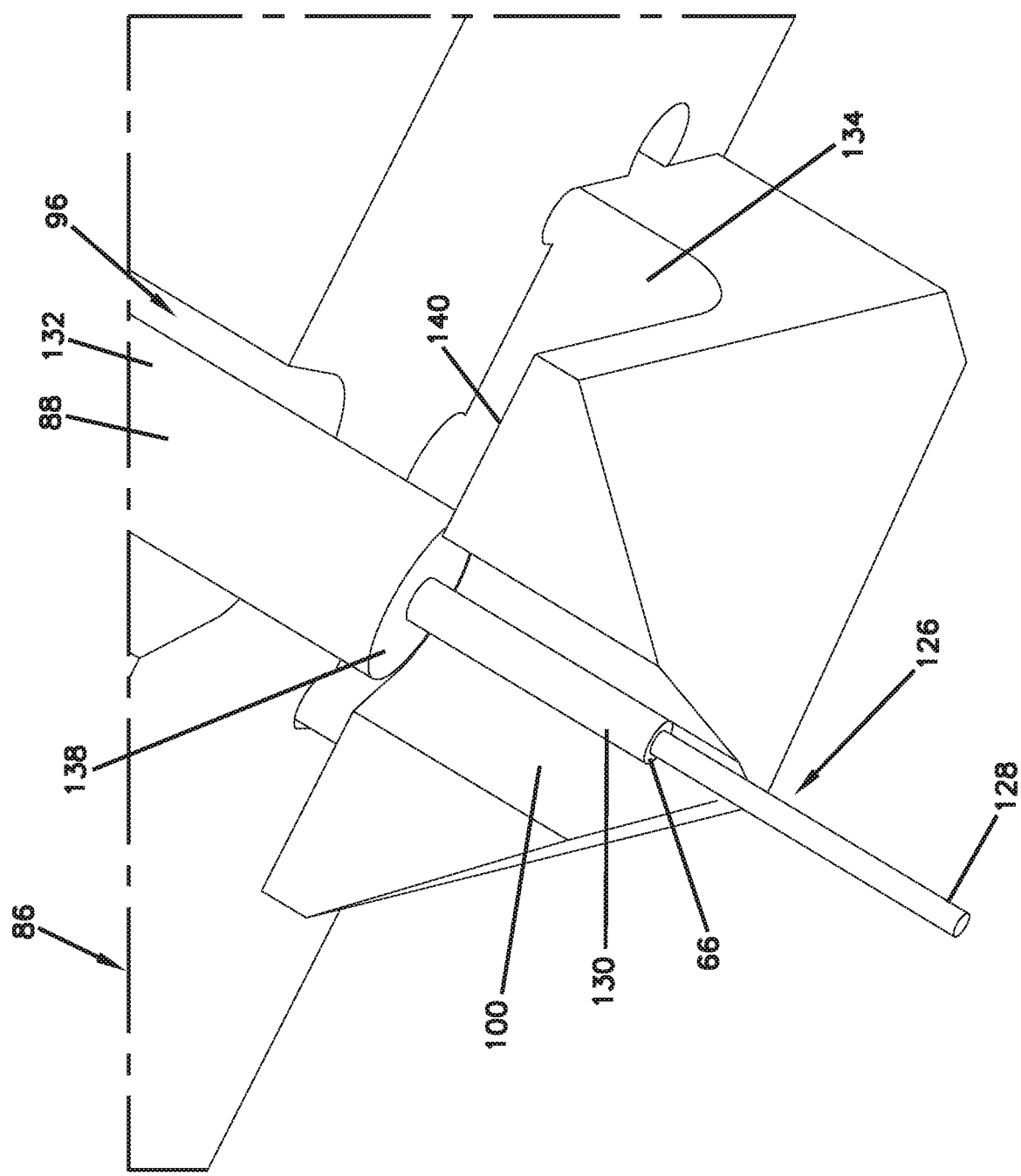
FIG. 13 is an enlarged view of a portion of a second alignment fixture of the fiber alignment and fusion splicing system FIG. 12, an optical fiber cable is shown in the fixture.

Referring to FIG. 13, an enlarged view of the fiber optic cable 88 within the second alignment fixture 86 is shown. The fiber optic cable 88 includes an optical fiber 126. At the prepared end portion of the fiber optic cable 88, the optical fiber 126 includes a bare fiber portion 128, a coated fiber portion 130 and a buffered fiber portion 132. The bare fiber portion 128 forms a free end of the optical fiber 126. The coated fiber portion 130 is positioned between the bare fiber portion 128 and the buffered fiber portion 132. The bare fiber portion 128 can include a glass core surrounded by a glass cladding layer.

As shown at FIGS. 10 and 13, the prepared end portion of the fiber optic cable 88 has been loaded within the second alignment fixture 86. When loaded, the buffered fiber portion 132 fits within the pre-locating v-groove 96, the coated fiber portion 130 fits within the fiber alignment v-groove 100, and the bare fiber portion 128 projects outwardly from the second alignment fixture 86 into the splicing location 108. The severed cleaved edge 66 of the fiber optic cable 88 is positioned in the fiber alignment v-groove 100. The second fiber alignment fixture 86 further includes an enlarged lead-in 134 for receiving a clamp or other structure attached to the cable 88. The enlarged lead-in 134 is enlarged as compared to the pre-locating v-groove 96. A slot 136 (see FIG. 10) is defined between the pre-locating v-groove 96 and the fiber alignment v-groove 100. An end 138 of the buffered fiber portion 132 can abut against a shoulder 140 located at an interface between the slot 136 and the fiber alignment v-groove 100.

At FIG. 10, the first and second fiber alignment fixtures 84, 86 have been oriented such that the bare fiber portion 38b of the ferrule assembly 20a and the bare fiber portion 128 of the fiber optic cable 88 are co-axially aligned. The ends of the bare fiber portions 38b, 128 meet at the splicing location 108 between the electrodes 104, 106 and within the field of view of the cameras 110. The ends of the bare fiber portions 38b, 128 touch and are co-axially aligned and an arc discharge is used to fuse the aligned bare fiber portions 38b, 128 together. As depicted, axes of the optical fibers 126, 24 are positioned within a vertical reference plane P. The pre-locating v-groove 94, the fiber alignment v-groove 98, the pre-locating v-groove 96, the fiber alignment v-groove 100 and the dust-cap v-groove 122 are all positioned along and bisected by the vertical reference plane P.

Although the depicted example shows an arrangement for splicing a ferrule assembly to a cable, alternative arrangements could be used. For example, two of the alignment fixtures 86 could be used in a similar way in the system 60 to splice together two fiber optic cables.

In certain examples, the pre-locating v-groove 94, the fiber alignment v-groove 98, the pre-locating v-groove 96, the fiber alignment v-groove 100 and the dust-cap v-groove 122 have curved (i.e., rounded) bottoms. In certain examples, the pre-locating v-groove 94, the fiber alignment v-groove 98, the pre-locating v-groove 96, the fiber alignment v-groove 100 and the dust-cap v-groove 122 have angled v-groove surfaces that extend from the open top sides to the curved bottoms. In certain examples, the angled surfaces of each v-groove are angled relative to one another by a v-groove angle in the range of 50-80 degrees or in the range of 50-70 degrees. In certain examples, pre-locating v-grooves 94, 96 can have larger v-groove angles than the fiber alignment v-grooves 98, 100. In certain examples, the curved bottoms can be defined by radii (i.e., radii of curvature) swung about a center of curvature. In one example, the curved bottoms of the fiber alignment v-grooves 98, 100 are defined by radii selected to match the outer radii of the coated fiber portions 38a, 130 intended to be received within the fiber alignment v-grooves 98, 100. In one example, the fiber alignment v-grooves 98, 100 have curved bottoms defined by radii in the range of 100-150 micrometers, or in the range of 115-135 micrometers so as to match the sizes of the coated fiber portions intended to be received therein.

In certain examples, the pre-locating v-grooves 94, 96 have curved bottoms defined by radii of curvature that are larger than the outer radii of the structures intended to be received therein. For example, when the pre-locating v-groove 94 is designed to receive an SC ferrule, the bottom of the pre-locating v-groove 94 can be defined by a radius larger than 1.25 millimeters. When the pre-locating v-groove 94 is designed to receive an SC ferrule, the bottom of the pre-locating v-groove 94 can be defined by a radius larger than 0.625 millimeters. When the pre-locating v-groove 96 is defined to receive a buffered fiber portion of a fiber optic cable, the bottom of the pre-locating v-groove 96 can be defined by a radius larger than 450 micrometers. In certain examples, the radius of the bottom of the pre-locating v-groove 96 is at least 3, 4, or 5 percent larger than that radius of the structure (i.e., the ferrule) the pre-locating v-groove 94 is intended to receive. In certain examples, the radius of the bottom of the pre-locating v-groove 96 is in the range of 2-8 percent larger than that radius of the structure (i.e., the ferrule) the pre-locating v-groove 94 is intended to receive. In certain examples, the radius of the bottom of the pre-locating v-groove 96 is at least 3, 4, 5, 10, or 15 percent larger than that radius of the structure (i.e., the buffered fiber portion) the pre-locating v-groove 94 is intended to receive.

Figure 14:
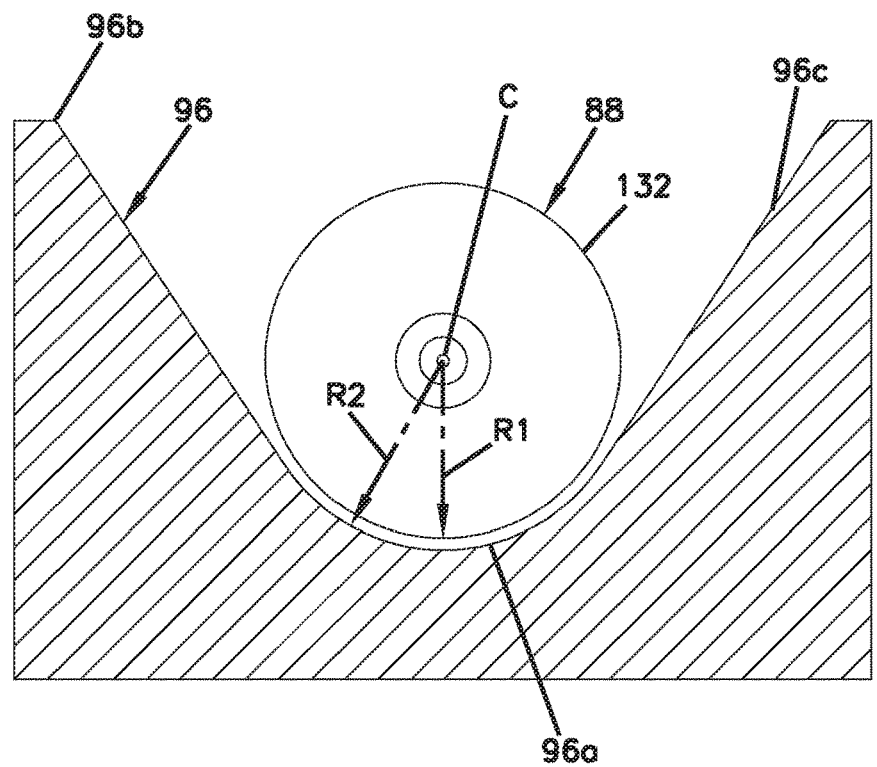
FIG. 14 is a cross-sectional view of a pre-locating v-groove of the second alignment fixture of FIG. 13 with a buffered portion of the optical fiber cable elevated within the pre-locating v-groove due to a coated portion of the optical fiber being pressed within the alignment v-groove.
Figure 15:
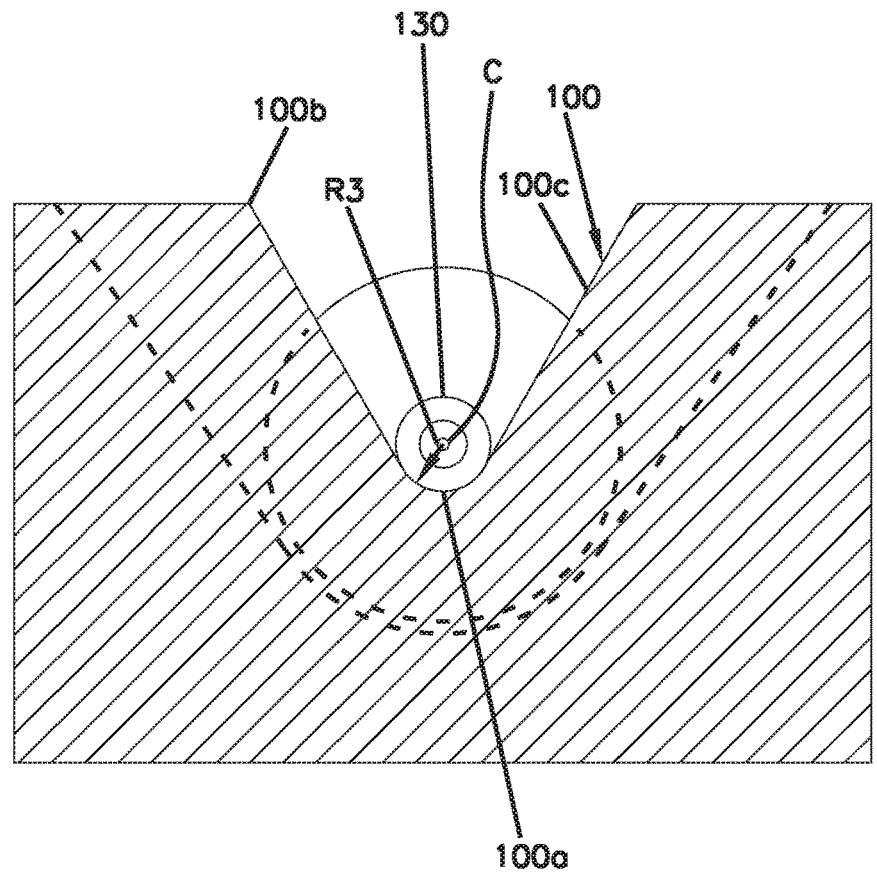
FIG. 15 is a cross-sectional view of an alignment v-groove of the second alignment fixture of FIG. 13 with the optical fiber cable being pressed therein.

As shown at FIGS. 14 and 15, the pre-locating v-groove 96 has a curved bottom 96a and the fiber alignment v-groove 100 has a curved bottom 100a. The pre-locating v-groove 96 can include an open top 96b and angled v-groove surfaces 96c. The fiber alignment v-groove 100 can include an open top 100b and angled v-groove surfaces 100c. The buffered fiber portion 132 has an outer radius R1 that is smaller than a radius R2 (i.e., radius of curvature) defining the curved bottom 96a of the pre-locating v-groove 96. The radius R2 is swung about a center of curvature C. As shown at FIG. 15, the curved bottom 100a of the fiber alignment v-groove 100 has generally the same radius R3 (i.e., radius of curvature) as the coated fiber portion 130. The radius R2 of the curved bottom 96a of the pre-locating v-groove 96 shares a common center of curvature C (i.e., the centers of curvature are co-axially aligned) with the curved bottom 100a of the fiber alignment v-groove 100.

In certain examples, the radii defining the curved bottoms of the pre-locating v-grooves 94, 96 are larger than the radii defining the curved bottoms of their corresponding fiber alignment v-grooves 98, 100. In certain examples, the radius defining the curved bottom of the pre-locating v-groove 96 is at least 2 or 3 times as large as the radii defining the curved bottom of the corresponding fiber alignment v-groove 100. For example, the radius defining the curved bottom of the pre-locating v-groove 94 is at least 2, 3, 4, 5, 6, 7 or 8 times as large as the radii defining the curved bottom of the corresponding fiber alignment v-groove 98.

Another aspect of the present disclosure relates to a method of fusion splicing an optical fiber. The optical fiber can have a glass core, a cladding layer, and a coating layer. The method can include the steps of: mechanically stripping the coating layer from the optical fiber to form a bare fiber end; inserting the bare fiber end of the optical fiber into a resistive heating element structure to remove residual coating from the cladding layer and to shape a severed end of the coating layer such that the severed end is fully within a cylindrical envelope defined by a non-disturbed portion of the coating layer; loading the optical fiber into an alignment groove of a fiber alignment fixture such that the shaped severed end of the optical fiber is in contact with the alignment groove; and fusion splicing the bare fiber end of the optical fiber to a cable fiber.

The present disclosure also relates to a method of fusion splicing optical fibers comprising. The method can include the steps of: removing residual coating from stripped surfaces of optical fibers to be fusion spliced including bare fiber ends of the optical fibers by inserting the bare fiber ends of the optical fibers in a resistive heating element structure. The resistive heating element structure can apply resistance heating that causes the removal of the residual coating and causes cut ends of a coating layer to be shaped such that the cut ends of the coating layer are fully within a cylindrical envelope respectively defined by a non-disturbed portion of the coating layer of the optical fibers. The method can also include a step of fusion splicing the bare fiber ends of the optical fibers.

Although, the thermal flash conditioning technology is illustrated as being used to remove residual debris prior to fusion splicing, it will be appreciated that the thermal flash conditioning technology may be practiced in a variety of fiber optic applications. For example, the thermal flash conditioning technology can be practiced when preparing optical fibers prior to being inserted into ferrules for traditional connector termination or other optical fiber processes.

The thermal flash conditioning technology can be used in any application that involves cleaning optical fibers of residual debris, shaping optical fibers prior to splicing, or other optical fiber treatments.

Some Selected Characterizations

The following characterizations are indicative of features and techniques according to the present disclosure that relate to: a method of fusion splicing an optical fiber, a method of end-to-end fusion splicing a ferrule fiber stub to an optical fiber; a method of fusion splicing optical fibers, an apparatus, and a heating chamber. In this summary, some selected, summary characterizations of the teachings herein are provided. The list of characterizations is not meant to be exhaustive. 1. An apparatus for removing residual coating exposed on a stripped optical fiber characterized by: a housing having side walls, a lid, and a bottom that together define a closed heating chamber, at least one side wall defining a center fiber insertion opening for allowing the stripped optical fiber to be inserted into the heating chamber; and a heating resistive element structure positioned within the heating chamber, the heating resistive element structure providing resistance heating to the stripped optical fiber to cause the residual coating to be removed therefrom, and to shape a severed cleaved edge of a coating layer of the stripped optical fiber such that the severed cleaved edge is within a cylindrical envelope defined by a non-disturbed portion of the coating layer. 2. The apparatus of characterization 1 wherein: the heating resistive element structure is a hot wire coil having a circuit for passing electrical current. 3. The apparatus of characterization 1 wherein: the heating resistive element structure is heated to a temperature of at least 900° C. 4. The apparatus of characterization 1 wherein: resistance heat is supplied to the stripped optical fiber to cause the removal of the residual coating therefrom in less than about 3 seconds. 5. A heating chamber for removing residual coating exposed on a stripped optical fiber characterized by: a first resistive plate; and a second resistive plate opposite the first resistive plate, the heating chamber having at least two enclosed sides defined by the first and second resistive plates; the first and second resistive plates each including a resistance coil for passing electrical current within the heating chamber, the first and second resistive plates being configured to apply resistance heating to the stripped optical fiber for removing the residual coating therefrom.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method of fusion splicing an optical fiber, the optical fiber having a glass core, a cladding layer, and a coating layer, the method comprising the steps of:
  mechanically stripping the coating layer from the optical fiber to form a bare fiber end including the glass core and the cladding layer;
  inserting the bare fiber end of the optical fiber into a resistive heating element structure to remove residual coating from the cladding layer of the bare fiber end and to shape a severed end of the coating layer such that the severed end is fully within a cylindrical envelope defined by a non-disturbed portion of the coating layer;
  loading the optical fiber into an alignment groove of a fiber alignment fixture such that the shaped severed end of the optical fiber is in contact with the alignment groove; and
  fusion splicing the bare fiber end of the optical fiber to a cable fiber.

2. The method of claim 1, wherein the loading of the optical fiber into the alignment groove of the fiber alignment fixture is achieved through an active alignment process.

3. The method of claim 1, wherein the step of fusing includes a process of heating the bare fiber end of the optical fiber to a cable fiber using an electric arc between electrodes.

4. The method of claim 1, wherein the step of fusing the bare fiber end of the optical fiber to a cable fiber includes a process of heating the bare fiber end and the cable fiber using an electric arc between electrodes.

5. The method of claim 1, wherein the step of loading includes aligning the bare fiber end of the optical fiber to the cable fiber.

6. The method of claim 1, wherein the step of fusion splicing includes applying energy to the bare fiber end of the optical fiber and the cable fiber.

7. A method of end-to-end fusion splicing a ferrule fiber stub to an optical fiber comprising the steps of:
  stripping a coating layer of the ferrule fiber stub and the optical fiber to expose bare fiber segments of the ferrule fiber stub and the optical fiber, the bare fiber segments including a glass core and cladding;
  inserting the bare fiber segments of the ferrule fiber stub and the optical fiber into a resistive heating element structure to remove residual coating from the cladding of the bare fiber segments and severed ends of the coating layer of both the ferrule fiber stub and the optical fiber are shaped such that the severed ends of the coating layer are fully within a cylindrical envelope defined by a non-disturbed portion of the coating layer;
  loading the ferrule fiber stub and the optical fiber into respective alignment grooves of a fiber alignment fixture such that the shaped severed ends of both the ferrule fiber stub and the optical fiber are respectively in contact with the alignment grooves; and
  fusion splicing the bare fiber segment of the ferrule fiber stub and the bare fiber segment of the optical fiber together.

8. The method of claim 7, wherein the loading of the ferrule fiber stub into the alignment groove of the fiber alignment fixture is achieved through an active alignment process.

9. The method of claim 7, wherein the step of fusing the bare fiber segments includes a process of heating the bare fiber segments using an electric arc between electrodes.

10. The method of claim 7, wherein the step of loading includes aligning the bare fiber segment of the ferrule fiber stub to the bare fiber segment of the optical fiber.

11. The method of claim 7, wherein the step of fusion splicing includes applying energy to the bare fiber segments of the ferrule fiber stub and the optical fiber.

12. A method of fusion splicing optical fibers comprising the steps of:
  removing residual coating from stripped surfaces of optical fibers to be fusion spliced including bare fiber ends of the optical fibers having a glass core and a cladding layer by inserting the bare fiber ends of the optical fibers into a resistive heating element structure, the resistive heating element structure applying resistance heating causing the removal of the residual coating and shaping cut ends of a coating layer of the optical fibers such that the cut ends of the coating layer are fully within a cylindrical envelope respectively defined by a non-disturbed portion of the coating layer of the optical fibers; and fusion splicing the bare fiber ends of the optical fibers.

13. The method of claim 12, further comprising the step of loading the optical fibers into respective alignment grooves of a fiber alignment fixture such that the shaped cut ends of the coating layer of the optical fibers are respectively in contact with the alignment grooves.

14. The method of claim 13, wherein the step of loading of the optical fibers into the alignment groove of the fiber alignment fixture is achieved through an active alignment process.

15. The method of claim 12, wherein the step of fusing the bare fiber ends of the optical fibers includes a process of heating the bare fiber ends using an electric arc between electrodes.

16. The method of claim 12, wherein the step of fusion splicing includes applying energy to the bare fiber ends of the optical fibers.

\* \* \* \* \*